United States Patent
Pelliconi et al.

(10) Patent No.: US 7,557,161 B2
(45) Date of Patent: *Jul. 7, 2009

(54) CRYSTALLINE PROPYLENE COPOLYMER COMPOSITIONS HAVING IMPROVED SEALABILITY AND OPTICAL PROPERTIES AND REDUCED SOLUBILITY

(75) Inventors: Anteo Pelliconi, Santa Maria Maddalena (IT); Enea Garagnani, Ferrara (IT); Paola Sgarzi, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 87 days.

This patent is subject to a terminal disclaimer.

(21) Appl. No.: 10/491,558

(22) PCT Filed: Oct. 4, 2002

(86) PCT No.: PCT/EP02/11129

§ 371 (c)(1), (2), (4) Date: Apr. 2, 2004

(87) PCT Pub. No.: WO03/031514

PCT Pub. Date: Apr. 17, 2003

(65) Prior Publication Data

US 2005/0107538 A1    May 19, 2005

(30) Foreign Application Priority Data

Oct. 9, 2001 (EP) .................................. 01124023

(51) Int. Cl.
*C08L 23/00* (2006.01)
*C08L 23/04* (2006.01)
*C08L 23/16* (2006.01)

(52) U.S. Cl. ..................................... 525/191; 525/240

(58) Field of Classification Search ................. 525/191, 525/240

See application file for complete search history.

(56) References Cited

U.S. PATENT DOCUMENTS

| 4,399,054 | A | | 8/1983 | Ferraris et al. | 252/429 B |
|---|---|---|---|---|---|
| 4,481,336 | A | | 11/1984 | Fujii et al. | 525/323 |
| 5,145,819 | A | | 9/1992 | Winter et al. | 502/117 |
| 5,324,800 | A | | 6/1994 | Welborn, Jr. et al. | 526/160 |
| 5,331,047 | A | | 7/1994 | Giacobbe | |
| 5,486,419 | A | * | 1/1996 | Clementini et al. | 428/397 |
| 5,948,547 | A | | 9/1999 | Mikielski et al. | 428/516 |
| 6,319,991 | B1 | * | 11/2001 | Okayama et al. | 525/240 |
| 6,395,831 | B1 | * | 5/2002 | Pelliconi et al. | 525/191 |
| 6,423,800 | B1 | * | 7/2002 | Musgrave | 526/227 |
| 6,541,570 | B2 | * | 4/2003 | Beccarini et al. | 525/191 |
| 2005/0272874 | A1 | * | 12/2005 | Pelliconi et al. | 525/240 |

FOREIGN PATENT DOCUMENTS

| EP | 0045977 | 2/1982 |
|---|---|---|
| EP | 0129368 | 12/1984 |
| EP | 0361493 | 4/1990 |
| EP | 0416815 | 3/1991 |
| EP | 0420436 | 4/1991 |
| EP | 0483523 | 5/1992 |
| EP | 0560326 | 9/1993 |
| EP | 0643066 | 3/1995 |
| EP | 0671404 | 9/1995 |
| EP | 0674991 | 10/1995 |
| EP | 0728769 | 8/1996 |
| WO | 9104257 | 4/1991 |
| WO | 0011076 | 3/2000 |

* cited by examiner

*Primary Examiner*—Nathan M Nutter
(74) *Attorney, Agent, or Firm*—William R. Reid

(57) ABSTRACT

Propylene polymer compositions comprising (by weight): A) from 15% to 60% with $C_4$-$C_8$ alpha-olefin(s), containing more than 10%, but less than 14%, of said $C_4$-$C_8$ alpha-olefins (s); B) from 40% to 85% of a copolymer of propylene with $C_4$-$C_8$ alpha-olefin(s), preferably butene, containing from 14% to 30% of said $C_4$-$C_8$ alpha-olefin(s), and optionally from 0.5% to 3% of ethylene; provided that the total content of $C_4$-$C_8$ alpha-olefin(s) in the propylene polymer composition be higher than 10%.

11 Claims, No Drawings

CRYSTALLINE PROPYLENE COPOLYMER COMPOSITIONS HAVING IMPROVED SEALABILITY AND OPTICAL PROPERTIES AND REDUCED SOLUBILITY

This application is the U.S. national phase of International Application PCT/EP02/11129, filed Oct. 4, 2002.

The present invention relates to crystalline propylene copolymer compositions useful in the preparation of heat-sealable films, sheets and films thereof and to a process for preparing said compositions.

Crystalline copolymers of propylene with other olefins (mainly ethylene, 1-butene or both), or mixtures of such copolymers with other olefin polymers are known in the prior art as heat-sealable materials.

These crystalline copolymers are obtained by polymerizing propylene with minor amounts of other olefin comonomers in the presence of coordination catalysts.

The polymerized comonomer units are statistically distributed in the resulting copolymer and the melting point of said copolymers results to be lower than the melting point of crystalline propylene homopolymers. Also the seal initiation temperature (as later defined in detail) of the said copolymers results to be favorably low.

However, the introduction of the comonomer units adversely affects the crystal structure of the polymer, resulting in relatively large quantities of a polymer fraction soluble in organic solvents, so that the copolymers having a particularly low seal initiation temperature cannot be used in the field of food packaging.

Many technical solutions are disclosed in the prior art in order to find a good balance between heat-sealability (as demonstrated by low seal initiation temperatures) and solubility. In particular, published European patent application 483523 discloses compositions prepared directly in a polymerization process, having a low seal initiation temperature and a low content of a fraction soluble in xylene at room temperature or in n-hexane at 50° C. These compositions comprise (by weight):

30-60% of a copolymer of propylene and a $C_4$-$C_8$ alpha-olefin, containing 80-98% of propylene;

35-70% of a copolymer of propylene with ethylene and optionally 1-10% of a $C_4$-$C_8$ alpha-olefin, wherein the content of ethylene is 5-10% when the $C_4$-$C_8$ alpha-olefin is not present, or 0.5-5% when the $C_4$-$C_8$ alpha-olefin is present.

Published European patent application 674991 discloses other compositions prepared directly in a polymerization process, having a good ink adhesion in addition to a low seal initiation temperature and low content of a polymer fraction soluble in organic solvents. These compositions comprise (by weight):

20-60% of a copolymer of propylene with ethylene, containing 1 to 5% of ethylene;

40-80% of a copolymer of propylene with ethylene and a $C_4$-$C_8$ alpha-olefin, the ethylene content being 1-5% and the $C_4$-$C_8$ alpha-olefin content being 6-15%;

the total content of ethylene in the compositions being 1-5% and the total content of $C_4$-$C_8$ alpha-olefin in the compositions being 2.4-12%.

Other heat-sealable compositions, comprising two different kinds of copolymers of propylene with higher alpha-olefins, are disclosed in the published European patent application 560326. Such compositions comprise (by weight):

20-60% of a copolymer of propylene containing 1-10% of a $C_4$-$C_{10}$ alpha-olefin;

40-80% of a copolymer of propylene containing 15-40% of a $C_4$-$C_{10}$ alpha-olefin, in which copolymer the product of multiplying the content of $C_4$-$C_{10}$ alpha-olefin by the content of the copolymer in the total composition, is equal to or greater than 1200.

In WO 00/11076 heat-sealable compositions with improved properties are described. Such compositions, obtained by degradation of a precursor typically prepared by sequential polymerization, comprise (percent by weight):

20-80% of one or more propylene copolymers selected from the group consisting of (i) propylene/ethylene copolymers containing 1-7% of ethylene; (ii) copolymers of propylene with one or more $C_4$-$C_8$ alpha-olefins, containing 2-10% of the $C_4$-$C_8$ alpha-olefins; (iii) copolymers of propylene with ethylene and one or more $C_4$-$C_8$ alpha-olefins, containing 0.5-4.5% of ethylene and 2-6% of $C_4$-$C_8$ alpha-olefins, provided that the total content of ethylene and $C_4$-$C_8$ alpha-olefins be equal to or lower than 6.5%;

20-80% of one or more propylene copolymers selected from the group consisting of copolymers of propylene with one or more $C_4$-$C_8$ alpha-olefins, containing from more than 10% to 30% of $C_4$-$C_8$ alpha-olefins, and copolymers of propylene with ethylene and one or more $C_4$-$C_8$ alpha-olefins, containing 1-7% of ethylene and 6-15% of $C_4$-$C_8$ alpha-olefins.

All these technical solutions are tailored in such a way as to have no more than one component containing more than 10% of $C_4$-$C_8$ alpha-olefins. Moreover, when a good ink adhesion is desired, also the total content of $C_4$-$C_8$ alpha-olefins in the compositions is kept relatively low (see EP-A-674991).

In U.S. Pat. No. 5,948,547 olefin polymer compositions with good levels of heat-sealability are described, comprising (by weight):

from 68% to 80% of a statistical copolymer of propylene with 12%-20% of 1-butene and 0%-2% ethylene;

from 32% to 20% of a statistical copolymer of propylene with 0%-15% of 1-butene and 1%-8% of ethylene, the two copolymers being different.

In such document it is explained that lower ethylene contents in the second copolymer would result in excessively high sealing temperature. In the examples sealing temperatures higher than 100° C. are reported.

It has now surprisingly been found that a particularly valuable balance of heat-sealability, low content of a fraction soluble in organic solvents and optical properties (in particular a very low Haze and high Gloss) is obtained when two coplymers containing more than 10% of $C_4$-$C_8$ alpha-olefins are combined in specific proportions. The high Gloss values attest to exceptionally good surface properties, in particular a very low stickiness and excellent printability/paintability, notwithstanding the high content in $C_4$-$C_8$ alpha-olefins.

Therefore the present invention provides propylene polymer compositions comprising (by weight):

A) from 15% to 60%, preferably from 20% to 60%, more preferably from 20% to 50%, of a copolymer of propylene with $C_4$-$C_8$ alpha-olefin(s), preferably butene, containing more than 10%, preferably 11% or more, but less than 14%, more preferably up to 13%-13.5%, of said $C_4$-$C_8$ alpha-olefin(s);

B) from 40% to 85%, preferably from 40% to 80%, more preferably from 50% to 80%, of a copolymer of propylene with $C_4$-$C_8$ alpha-olefin(s), preferably butene, containing from 14% to 30%, preferably from 14.5% to 25%, more preferably from 14.5% to 22%, of said $C_4$-$C_8$ alpha-olefin(s), and optionally from 0.5% to 3% of ethylene;

provided that the total content of $C_4$-$C_8$ alpha-olefin(s) in the propylene polymer composition be higher than 10%.

Preferably the total content of $C_4$-$C_8$ alpha-olefin(s) in the propylene polymer composition is equal to or greater than 13%, more preferably greater than 14.5%, and up to 20%-25%. Preferably the copolymer A) is substantially free from ethylene.

From the above definitions it is evident that the term "copolymer" includes polymers containing more than one kind of comonomers.

Preferably the Melt Flow Rate (MFR L) values for the compositions of the present invention range from 2 to 15 g/10 min., more preferably from 2.5 to 10 g/10 min.

The said MFR L values can be obtained directly in polymerization, but preferably they are obtained by subjecting to degradation a precursor composition comprising the same components A) and B) in the above said proportions, but having WR L values (MFR L (1)) from 0.1 to 5 g/10 min., preferably from 0.3 to 3 g/10 min., with a ratio MFR L (final) to MFR L (1) of from 2 to 20, preferably from 3 to 15.

As previously said, the compositions of the present invention have low seal initiation temperatures (preferably lower than 100° C.), a low content of a fraction soluble or extractable in organic solvents (preferably equal to or lower than 20% by weight in xylene at 25° C. and equal to or lower than 6% by weight in n-hexane at 50° C.), very low haze values (preferably lower than 1%, more preferably equal to or lower than 0.5%, measured on films according to the method described in the examples), and high gloss values (preferably higher than 85%, measured on films according to the method described in the examples).

The melting temperature of said composition is preferably from about 125 to 140° C.

In particular, the melting temperature of both the total composition and the component A) is most preferably lower than 135° C., for instance from 125 to 134° C.

Moreover, when thermal degradation is to be applied, the compositions of the present invention can be obtained by an efficient and inexpensive process (constituting a further object of the present invention), comprising the following stages:

1) preparing the previously said precursor composition by polymerizing the monomers in at least two sequential steps, wherein components A) and B) are prepared in separate subsequent steps, operating in each step in the presence of the polymer formed and the catalyst used in the preceding step, and dosing the molecular weight regulator (preferably hydrogen) in such amounts as to obtain a MFR L (1) value for the precursor composition of from 0.1 to 5 g/10 min., preferably from 0.3 to 3 g/10 min.;
2) subjecting the precursor composition obtained in 1) to a degradation treatment in order to obtain the desired MFR L (final) values for the final composition, with a degradation ratio, in terms of ratio MFR L (final) to MFR L (1), of from 2 to 20, preferably from 3 to 15.

Such a preferred process is extremely convenient, as it avoids the separate preparation of the components of the precursor composition and separate degradation treatments.

From the preceding description it should be clear that in the precursor composition the comonomer content and relative amounts of components A) and B) are the same as in the final composition (after degradation). The degradation treatment has the effect of increasing the MFR L values of the composition from MFR L (1) to MFR L (final), with the said values of the ratio between the two MFR L values, namely MFR L (final)/MFR L (1), of from 2 to 20.

The above said MFR L values are measured according to ASTM D 1238 L.

In both the precursor and the final compositions the MFR L values of the components A) and B) are not particularly critical, provided that the MFR L values of the total compositions fall within the said ranges.

Indicatively, the MFR L value of both A) and B) can be from 0.1 to 5 g/10 min.

Examples of $C_4$-$C_8$ alpha olefins are 1-butene, 1-pentene, 1-hexene, 4-methyl-1-pentene and 1-octene. Particularly preferred is 1-butene.

As previously explained, the compositions can be prepared by a sequential polymerization, comprising at least two sequential steps, wherein components A) and B) are prepared in separate subsequent steps, operating in each step, except the first step, in the presence of the polymer formed and the catalyst used in the preceding step. The catalyst is added only in the first step, however its activity is such that it is still active for all the subsequent steps.

The order in which components A) and B) are prepared is not critical.

The polymerization stage, which can be continuous or batch, is carried out following known techniques and operating in liquid phase, in the presence or not of inert diluent, or in gas phase, or by mixed liquid-gas techniques. It is preferable to carry out the polymerization in gas phase.

Reaction time, pressure and temperature relative to the two steps are not critical, however it is best if the temperature is from 20 to 100° C. The pressure can be atmospheric or higher. The regulation of the molecular weight is carried out by using known regulators, hydrogen in particular.

Such polymerization is preferably carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an isotactic index greater than 90%, preferably greater than 95%. Catalysts having the above mentioned characteristics are well known in the patent literature; particularly advantageous are the catalysts described in U.S. Pat. No. 4,399,054 and European patent 45977.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of formula:

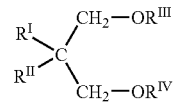

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Fi ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are $(tert-butyl)_2$ Si $(OCH_3)_2$, (cyclohexyl) (methyl) Si $(OCH_3)_2$, $(phenyl)_2$ Si $(OCH_3)_2$ and $(cyclopentyl)_2$ Si $(OCH_3)_2$. 1,3-diethers having the formulae described above can also be used advantageously. If the internal donor is one of these dieters, the external donors can be omitted.

The catalysts can be pre-contacted with small amounts of olefins (prepolymerization).

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used to produce the components A) and B).

The degradation treatment, when used, can be carried out by any means and under the conditions known in the art to be effective in reducing the molecular weight of olefin polymers.

In particular it is known that the molecular weight of olefin polymers can be reduced by application of heat (thermal degradation), preferably in the presence of initiators of free radicals, like ionizing radiations or chemical initiators.

Particularly preferred among the chemical initiators are the organic peroxides, specific examples of which are 2,5-dimethyl-2,5-di (t-butylperoxy) hexane and dicumyl-peroxide. The degradation treatment with the chemical initiators can be carried out in the conventional apparatuses generally used for processing polymers in the molten state, like in particular single or twin screw extruders. It is preferred to operate under inert atmosphere, for instance under nitrogen.

The amount of chemical initiator to be added to the precursor composition can be easily determined by one skilled in the art, based upon the MFR L (I) value (i.e. the MFR L value of the precursor composition) and the desired MFR L (final) value. Generally such amount is comprised in the range of from 100 to 700 ppm.

The degradation temperature is preferably in the range of from 180 to 300° C.

The compositions of the present invention can also contain additives commonly employed in the art, such as antioxidants, light stabilizers, heat stabilizers, colorants and fillers.

Among the various applications made possible by the previously described properties, the compositions of the present invention are particularly useful for the preparation of films and sheets.

Films are generally characterized by a thickness of less than 100 μm, while sheets have generally a thickness greater than or equal to 100 μm.

Both films and sheets can be mono- or multilayer.

In the case of multilayer films or sheets, at least one layer comprises the compositions of the present invention. Each layer that does not comprise the compositions of the present invention can be composed of other olefin polymers, such as polypropylene or polyethylene. Generally speaking, the films and sheets of this invention can be prepared by known techniques, such as extrusion and calendering. Specific examples of films containing the compositions of the present invention are disclosed hereinafter in the test for determining the seal initiation temperature (S.I.T.).

The particulars are given in the following examples, which are given to illustrate, without limiting, the present invention.

EXAMPLES 1-3

In the following Examples precursor compositions are prepared by sequential polymerization, and then subjected to degradation.

The solid catalyst component used in polymerization is a highly stereospecific Ziegler-Natta catalyst component supported on magnesium chloride, containing about 2.5% by weight of titanium and diisobutylphthalate as internal donor, prepared by analogy with the method described in the examples of European published patent application 674991.

Catalyst System and Prepolymerization Treatment

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 4 and in such quantity that the TEAL/Ti molar ratio be equal to 65.

The catalyst system is then subjected to prepolymerization by maintaining it in suspension in liquid propylene at 20° C. for about 20 minutes before introducing it into the first polymerization reactor.

Polymerization

Into a first gas phase polymerization reactor a propylene/butene copolymer (component A)) is produced by feeding in a continuous and constant flow the prepolymerized catalyst system, hydrogen (used as molecular weight regulator) and propylene and butene monomers in the gas state.

Polymerization conditions, molar ratio of the reactants, and composition of the copolymers obtained are shown in Table 1.

The copolymer produced in the first reactor, constituting 43% by weight of the total composition, is discharged in a continuous flow and, after having been purged of unreacted monomers, is introduced in a continuous flow into a second gas phase reactor, together with quantitatively constant flows of hydrogen and propylene, ethylene and 1-butene monomers in the gas state.

The propylene/ethylene/1-butene copolymer formed in the second reactor (component B)) is produced in a quantity equal to 57% by weight with respect to the total composition. Polymerization conditions, molar ratio of the reactants and composition of the copolymers obtained are shown in Table 1.

The polymer particles exiting the second reactor are subjected to a steam treatment to remove the reactive monomers and volatile substances, and then dried.

Then the polymer particles are introduced in a rotating drum, where they are mixed with 0.05% by weight of paraffin oil ROL/OB 30 (having a density of 0.842 kg/l at 20° C. according to ASTM D 1298 and flowing point of −10° C. according to ASTM D 97), 0.2% by weight of Irganox B 225 (made of about 50% Irganox 1010 and 50% Irgafos 168), 0.05% by weight of calcium stearate and 230 ppm of Luperox 101 (2,5-dimethyl-2,5-di (t-butylperoxy) hexane), which acts as initiator of free radicals in the subsequent extrusion treatment. The previously said Irganox 1010 is pentaerytrityl tetrakis 3-(3,5-di-tert-butyl-4-hydroxyphenyl) propanoate, while Irgafos 168 is tris (2,4-di-tert-butylphenyl) phosphite.

Then the polymer particles are introduced in a twin screw extruder Berstorff ZE 25 (length/diameter ratio of screws: 33) and extruded under nitrogen atmosphere in the following conditions:

| Rotation speed: | 250 rpm; |
| Extruder output: | 6-20 kg/hour; |
| Melt temperature: | 200-250° C. |

The data relating to the polymer compositions so obtained are reported in Table 1b.

EXAMPLES 4-6

Catalyst system and prepolymerization treatment are the same as in Examples 1-3.

Into a first gas phase polymerization reactor a propylene/butene copolymer (component A)) is produced by feeding in a continuous and constant flow the prepolymerized catalyst system, hydrogen (used as molecular weight regulator) and propylene and butene monomers in the gas state.

Polymerization conditions, molar ratio of the reactants, and composition of the copolymers obtained are shown in Table 2.

The copolymer produced in the first reactor, constituting 25% by weight of the total composition in Examples 4 and 5, and 30% of the total composition in Example 6, is discharged in a continuous flow and, after having been purged of unreacted monomers, is introduced in a continuous flow into a second gas phase reactor and then, again in continuous flow and after having been purged of unreacted monomers, in a third gas phase reactor, together with quantitatively constant flows of hydrogen and propylene, ethylene and 1-butene monomers in the gas state.

The propylene/ethylene/1-butene copolymer formed in the second and third reactor (component B)) is produced in a quantity equal to 75% by weight with respect to the total composition in Examples 4 and 5, and 70% in Example 6.

In detail, the amount of copolymer produced in the second reactor is 50% in Examples 4 and 5, and 40% in Example 6, while the amount of copolymer produced in the third reactor is 25% in Examples 4 and 5, and 30% in Example 6, always referred to the total composition.

Polymerization conditions, molar ratio of the reactants and composition of the copolymers obtained are shown in Table 2.

The polymer particles exiting the third reactor are subjected to a steam treatment to remove the reactive monomers and volatile substances, and then dried.

The product so obtained is further treated with additives and extruded using same additives, additive amounts and conditions as in Examples 1-3, except that the amount of Luperox 101 is 250 ppm.

The data relating to the polymer compositions so obtained are reported in Table 2b.

The data shown in the tables are obtained by using the following test methods.

Molar Ratios of the Feed Gases
    Determined by gas-chromatography.

Ethylene and 1-Butene Content of the Polymers
    Determined by I.R. spectroscopy.

Melt Flow Rate MFR L
    Determined according to ASTM D 1238, condition L.

Melting Temperature (Tm) and Crystallization Temperature (Tc)
    Determined by DSC (Differential Scanning Calorimetry).

Xylene Soluble Fraction
    Determined as follows.
    2.5 g of polymer and 250 $cm^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 $cm^3$ of the filtered liquid is poured in a previously weighed aluminum container which is heated on a heating plate under nitrogen flow, to remove the solvent by evaporation. The container is then kept in an oven at 80° C. under vacuum until constant weight is obtained.

Hexane Soluble Fraction
    Determined according to FDA 177, 1520, by suspending in an excess of hexane a 100 μm thick film specimen of the composition being analyzed, in an autoclave at 50° C. for 2 hours. Then the hexane is removed by evaporation and the dried residue is weighed.

Seal Initiation Temperature (S.I.T.)
Determined as follows.
Preparation of the Film Specimens
Some films with a thickness of 50 μm are prepared by extruding each test composition in a single screw Collin extruder (length/diameter ratio of screw: 25) at a film drawing speed of 7 m/min. and a melt temperature of 210-250° C. Each resulting film is superimposed on a 1000 μm thick film of a propylene homopolymer having an isotacticity index of 97 and a MFR L of 2 g/10 min. The superimposed films are bonded to each other in a Carver press at 200° C. under a 9000 kg load, which is maintained for 5 minutes.
The resulting laminates are stretched longitudinally and transversally, i.e. biaxially, by a factor 6 with a TM Long film stretcher at 150° C., thus obtaining a 20 μm thick film (18 μm homopolymer+2 μm test composition).
2×5 cm specimens are cut from the films.

Determination of the S.I.T.
For each test two of the above specimens are superimposed in alignment, the adjacent layers being layers of the particular test composition. The superimposed specimens are sealed along one of the 5 cm sides with a Brugger Feinmechanik Sealer, model HSG-ETK 745. Sealing time is 0.5 seconds at a pressure of 0.1 N/mm². The sealing temperature is increased for each seal, starting from about 10° C. less than the melting temperature of the test composition. The sealed samples are left to cool and then their unsealed ends are attached to an Instron machine where they are tested at a traction speed of 50 mm/min.
The S.I.T. is the minimum sealing temperature at which the seal does not break when a load of at least 2 Newtons is applied in the said test conditions.

Haze on Film
Determined on 50 μm thick films of the test composition, prepared as described for the S.I.T. test. The measurement is carried out on a 50×50 mm portion cut from the central zone of the film.
The instrument used for the test is a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

Gloss on Film
Determined on the same specimens as for the Haze.
The instrument used for the test is a model 1020 Zehntner photometer for incident measurements. The calibration is made by carrying out a measurement at incidence angle of 60° on black glass having a standard Gloss of 96.2% and a measurement at an incidence angle of 45° on black glass having a standard Gloss of 55.4%.

TABLE 1

| | EXAMPLES | | |
|---|---|---|---|
| | 1 | 2 | 3 |
| 1$^{st}$ REACTOR | | | |
| Temperature, ° C. | 65 | 65 | 65 |
| Pressure, MPa | 14 | 14 | 14 |
| $H_2/C_3^-$, mol. | 0.006 | 0.006 | 0.006 |
| $C_4^-/C_4^- + C_3^-$, mol. | 0.2 | 0.2 | 0.2 |
| RESULTING POLYMER | | | |
| $C_4^-$, % | 12 | 12.2 | 12.1 |
| MFR L, g/10 min. | 1.8 | 2.4 | 2.1 |
| 2$^{nd}$ REACTOR | | | |
| Temperature, ° C. | 70 | 70 | 70 |
| Pressure, MPa | 14 | 14 | 14 |
| $H_2/C_3^-$, mol. | 0.005 | 0.005 | 0.005 |
| $C_2^-/C_2^- + C_3^-$, mol. | 0.01 | 0.01 | 0.01 |
| $C_4^-/C_4^- + C_3^-$, mol. | 0.25 | 0.27 | 0.27 |
| RESULTING POLYMER | | | |
| $C_2^-$, % | 1.5 | 1.05 | 1.2 |
| $C_4^-$, % | 15.3 | 18.0 | 18.7 |
| TOTAL COMPOSITION | | | |
| $C_2^-$, % | 0.85 | 0.6 | 0.7 |
| $C_4^-$, % | 13.9 | 15.5 | 15.85 |
| MFR L, g/10 min. | 1.1 | 1.03 | 1.2 |

TABLE 1 b

| | EXAMPLES | | |
|---|---|---|---|
| | 1 | 2 | 3 |
| MFR L, g/10 min. | 5.8 | 5.4 | 5.8 |
| X.I., % | 88.8 | 84.3 | 84.3 |
| H.S., % | 3.1 | 4.7 | 5 |
| X.S. I.V., dl/g | 1.89 | 1.77 | 1.77 |
| Tm, ° C. | 135 | 132 | 133 |
| Tc, ° C. | 87 | 83 | 81 |
| S.I.T., ° C. | 103 | 95 | 95 |
| Haze, % | 0.37 | — | 0.2 |
| Gloss, ‰ | 90.4 | — | 91 |

TABLE 2

| | EXAMPLES | | |
|---|---|---|---|
| | 4 | 5 | 6 |
| 1$^{st}$ REACTOR | | | |
| Temperature, ° C. | 67 | 67 | 67 |
| Pressure, MPa | 14 | 14 | 14 |
| $H_2/C_3^-$, mol. | 0.007 | 0.006 | 0.007 |
| $C_4^-/C_4^- + C_3^-$, mol. | 0.2 | 0.2 | 0.2 |
| RESULTING POLYMER | | | |
| $C_4^-$, % | 12 | 12.2 | 12.1 |
| MFR L, g/10 min. | 2.9 | 2.2 | 2.9 |
| 2$^{nd}$ REACTOR | | | |
| Temperature, ° C. | 70 | 70 | 70 |
| Pressure, MPa | 14 | 14 | 14 |
| $H_2/C_3^-$, mol. | 0.004 | 0.004 | 0.005 |
| $C_2^-/C_2^- + C_3^-$, mol. | 0.0082 | 0.0082 | 0.0082 |
| $C_4^-/C_4^- + C_3^-$, mol. | 0.26 | 0.26 | 0.26 |
| RESULTING POLYMER | | | |
| $C_2^-$, % | 1.07 | 0.93 | 1 |
| $C_4^-$, % | 16 | 16.6 | 16 |
| 3$^{rd}$ REACTOR | | | |
| Temperature, ° C. | 65 | 65 | 65 |
| Pressure, MPa | 14 | 14 | 14 |

TABLE 2-continued

| | EXAMPLES | | |
|---|---|---|---|
| | 4 | 5 | 6 |
| $H_2/C_3^-$, mol. | 0.004 | 0.004 | 0.003 |
| $C_2^-/C_2^- + C_3^-$, mol. | 0.010 | 0.010 | 0.010 |
| $C_4^-/C_4^- + C_3^-$, mol. | 0.26 | 0.26 | 0.26 |
| RESULTING POLYMER | | | |
| $C_2^-$, % | 1.07 | 0.93 | 1 |
| $C_4^-$ % | 16 | 16.6 | 16 |
| TOTAL COMPOSITION | | | |
| $C_2^-$, %, | 0.8 | 0.7 | 0.7 |
| $C_4^-$, % | 15 | 15.5 | 14.8 |
| MFR L, g/10 min. | 0.96 | 0.95 | 0.77 |

TABLE 2b

| | EXAMPLES | | |
|---|---|---|---|
| | 4 | 5 | 6 |
| MFR L, g/10 min. | 4.3 | 4.4 | 5.8 |
| X.I., % | 89.2 | 90.2 | 91.5 |
| H.S., % | 5.4 | 5.7 | 4.6 |
| X.S. I.V., dl/g | 1.4 | 1.44 | 1.38 |
| Tm, °C. | 127 | 127 | 128.8 |
| Tc, °C. | 81 | 83 | 84.96 |
| S.I.T., °C. | 93 | 93 | 95 |
| Haze, % | 0.2 | 0.3 | 0.2 |
| Gloss, ‰ | 91 | 90 | 90 |

Note to the tables:
$C_2^-$ = ethylene;
$C_3^-$ = propylene;
$C_4^-$ = 1-butene;
X.I. = Xylene Insoluble fraction;
H.S. = Hexane Soluble fraction;
X.S. I.V. = Intrinsic Viscosity of Xilene Soluble fraction;
all percent amounts (except for Haze) are by weight.

The invention claimed is:

1. Propylene polymer compositions comprising (by weight):
    A) from 20% to 50% of a copolymer of propylene with $C_4$-$C_8$ alpha-olefin(s), containing from 11%, to less than 14%, of said $C_4$-$C_8$ alpha-olefin(s); and
    B) from 50% to 80% of a copolymer of propylene with $C_4$-$C_8$ alpha-olefin(s), containing from 14% to 30% of said $C_4$-$C_8$ alpha-olefin(s), and optionally from 0.5% to 3% of ethylene.

2. The propylene polymer compositions of claim 1, wherein the total content of $C_4$-$C_8$ alpha-olefin(s) is at least 13%.

3. The propylene polymer compositions of claim 1, having MFR L values from 2 to 15 g/10 min.

4. A propylene polymer composition obtained by subjecting a precursor composition having an MFR L (1) of from 0.1 to 5 g/10 min, comprising (by weight):
    A) from 20% to 50% of a copolymer of propylene with $C_4$-$C_8$ alpha-olefin(s), containing from 11% to less than 14%, of said $C_4$-$C_8$ alpha-olefin(s); and
    B) from 50% to 80% of a copolymer of propylene with $C_4$-$C_8$ alpha-olefin(s), containing from 14% to 30% of said $C_4$-$C_8$ alpha-olefin(s), and optionally from 0.5% to 3% of ethylene;
to degradation, thereby producing an MFR L, wherein a ratio MFR L to MFR L (1) is from 2 to 20.

5. A process for preparing propylene polymer compositions comprising the following stages:
    1) preparing a precursor composition having an MFR L (1) of from 0.1 to 5 g/10 min. comprising (by weight):
        A) from 20% to 50% of a copolymer of propylene with $C_4$-$C_8$ alpha-olefin(s), containing from 11%, to less than 14%, of said $C_4$-$C_8$ alpha-olefin(s); and
        B) from 50% to 80% of a copolymer of propylene with $C_4$-$C_8$ alpha-olefin(s), containing from 14% to 30% of said $C_4$-$C_8$ alpha-olefin(s), and optionally from 0.5% to 3% of ethylene; by polymerizing the monomers in at least two sequential steps, wherein components A) and B) are prepared in separate subsequent steps, operating in each step in the presence of the polymer formed and the catalyst used in the preceding step; and
    2) subjecting the precursor composition obtained in 1) to a degradation treatment, thereby obtaining a MFR L of 2-15, wherein a ratio MFR L to MFR L (1), is from 2 to 20.

6. A propylene polymer composition comprising (by weight):
    A) from 20% to 50% of a copolymer of propylene with $C_4$-$C_8$ alpha-olefin(s), containing from 11% to less than 14%, of said $C_4$-$C_8$ alpha-olefin(s);
    B) from 50% to 80% of a copolymer of propylene with $C_4$-$C_8$ alpha-olefin(s), containing from 14% to 30% of said $C_4$-$C_8$ alpha-olefin(s), and optionally from 0.5% to 3% of ethylene; and a fraction soluble in xylene of at most 20% by weight.

7. A propylene polymer composition obtained by subjecting a precursor composition having an MFR L (1) of from 0.1 to 5 g/10 min, comprising (by weight):
    A) from 20% to 50% of a copolymer of propylene with $C_4$-$C_8$ alpha-olefin(s), containing from 11% to less than 14%, of said $C_4$-$C_8$ alpha-olefin(s); and
    B) from 50% to 80% of a copolymer of propylene with $C_4$-$C_8$ alpha-olefin(s), containing from 14% to 30% of said $C_4$-$C_8$ alpha-olefin(s), and optionally from 0.5% to 3% of ethylene;
to degradation, thereby producing an MFR L, wherein a ratio MFR L to MFR L (1) is from 2 to 20, the propylene polymer composition comprising a fraction soluble in xylene of at most 20% by weight.

8. A process for preparing propylene polymer compositions comprising the following stages:
    1) preparing a precursor composition having an MFR L (1) of from 0.1 to 5 g/10 min. comprising (by weight):
        A) from 20% to 50% of a copolymer of propylene with $C_4$-$C_8$ alpha-olefin(s), containing from 11% to less than 14%, of said $C_4$-$C_8$ alpha-olefin(s); and
        B) from 50% to 80% of a copolymer of propylene with $C_4$-$C_8$ alpha-olefin(s), containing from 14% to 30% of said $C_4$-$C_8$ alpha-olefin(s), and optionally from 0.5% to 3% of ethylene;
        by polymerizing the monomers in at least two sequential steps, wherein components A) and B) are prepared in separate subsequent steps, operating in each step in the presence of the polymer formed and the catalyst used in the preceding step; and 2) subjecting the precursor composition obtained in 1) to a degradation treatment, thereby obtaining a MFR L of 2-15, wherein a ratio MFR L to MFR L (1), is from 2 to 20, wherein the propylene polymer composition comprises a fraction soluble in xylene of at most 20% by weight.

9. The propylene polymer composition of claim 6 further comprising a haze value lower than 1% measured on a 50 μm thick film comprising the propylene polymer composition.

10. The propylene polymer composition of claim 7 further comprising a haze value lower than 1% measured on a 50 μm thick film comprising the propylene polymer composition.

11. The process of claim 8 further comprising a haze value of the propylene polymer composition lower than 1% measured on a 50 μm film comprising the propylene polymer composition.

* * * * *